US009906509B2

(12) United States Patent
Lu et al.

(10) Patent No.: US 9,906,509 B2
(45) Date of Patent: Feb. 27, 2018

(54) METHOD FOR OFFLINE DRM AUTHENTICATION AND A SYSTEM THEREOF

(75) Inventors: Zhou Lu, Beijing (CN); Hua Zhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 1142 days.

(21) Appl. No.: 12/269,701

(22) Filed: Nov. 12, 2008

(65) Prior Publication Data

US 2009/0183001 A1    Jul. 16, 2009

(30) Foreign Application Priority Data

Jan. 16, 2008    (CN) .......................... 2007 1 0175552

(51) Int. Cl.
| H04L 9/32 | (2006.01) |
| H04L 29/06 | (2006.01) |
| G06F 21/10 | (2013.01) |

(52) U.S. Cl.
CPC .............. *H04L 63/08* (2013.01); *G06F 21/10* (2013.01); *H04L 2463/101* (2013.01)

(58) Field of Classification Search
CPC ..... H04L 9/32; H04L 63/08; H04L 2209/603; H04N 2201/3246; G06F 17/30374
USPC ........................................... 713/168; 726/27
See application file for complete search history.

(56) References Cited

U.S. PATENT DOCUMENTS

| 5,671,412 | A | * | 9/1997 | Christiano | ............. G06Q 30/04 |
| 6,697,944 | B1 | * | 2/2004 | Jones | ...................... G06F 21/10 |
| | | | | | 705/50 |
| 6,948,070 | B1 | * | 9/2005 | Ginter et al. | ................. 713/193 |
| 8,788,723 | B1 | * | 7/2014 | Hogan | .................... G06F 13/38 |
| | | | | | 710/18 |

(Continued)

FOREIGN PATENT DOCUMENTS

| GB | 2434228 A | * | 7/2007 |
| WO | 2006/057248 | | 6/2006 |

OTHER PUBLICATIONS

Chong et al., Secure Audit Logging With Tamper Resistant Hardware, Universiteit Twente, Enschede, The Netherlands., D. Gritzalis et al. (eds.), Security and Privacy in the Age of Uncertainty, © Springer Science+Business Media New York 2003, pp. 73-84.*

*Primary Examiner* — Mohammad A Siddiqi
(74) *Attorney, Agent, or Firm* — Workman Nydegger

(57) ABSTRACT

A method for offline DRM authentication and a system thereof relates to the information security field. In order to solve the problem that a license must be requested from the server in the process of DRM authentication, the invention provides a method for offline DRM authentication, in which, the method comprises: a content provider encrypts the data file with DRM standard and stores the internal information in an authentication device, the authentication device is connected to the local computer, the software program on the local computer opens and reads the data file. A system for offline DRM authentication, in which, the system comprises an authentication device, a client PC and content provider side, the authentication device comprises the DRM service module and authentication communication module. Compared with the prior art, the present invention allows the user to use the DRM protected information without a network connection.

15 Claims, 3 Drawing Sheets

(56) References Cited

U.S. PATENT DOCUMENTS

| | | | |
|---|---|---|---|
| 2004/0168061 A1* | 8/2004 | Kostal et al. | 713/170 |
| 2004/0168073 A1* | 8/2004 | Bourne et al. | 713/193 |
| 2005/0195978 A1* | 9/2005 | Babic et al. | 380/231 |
| 2005/0227773 A1* | 10/2005 | Lu et al. | 472/60 |
| 2006/0080535 A1* | 4/2006 | Elazar ... G06F 21/10 | 713/176 |
| 2006/0184806 A1* | 8/2006 | Luttmann et al. | 713/193 |
| 2006/0288424 A1* | 12/2006 | Saito | 726/26 |
| 2007/0086724 A1* | 4/2007 | Grady ... H04N 5/765 | 386/230 |
| 2007/0174205 A1* | 7/2007 | Saito ... G06Q 30/06 | 705/59 |
| 2007/0189517 A1* | 8/2007 | Koseki ... H04L 9/3242 | 380/30 |
| 2007/0269044 A1* | 11/2007 | Bruestle ... G06F 21/10 | 380/54 |
| 2008/0065911 A1* | 3/2008 | Elazar ... G06F 21/10 | 713/194 |
| 2008/0089658 A1* | 4/2008 | Grady ... H04N 5/225 | 386/200 |
| 2008/0089667 A1* | 4/2008 | Grady ... G11B 27/034 | 386/200 |
| 2008/0092200 A1* | 4/2008 | Grady ... G11B 27/034 | 725/133 |
| 2008/0098212 A1* | 4/2008 | Helms et al. | 713/155 |
| 2008/0112405 A1* | 5/2008 | Cholas et al. | 370/389 |
| 2008/0138028 A1* | 6/2008 | Grady ... H04N 1/00299 | 386/291 |
| 2008/0147556 A1* | 6/2008 | Smith et al. | 705/57 |
| 2008/0148363 A1* | 6/2008 | Gilder et al. | 726/4 |
| 2008/0240447 A1* | 10/2008 | Zhu et al. | 380/279 |
| 2008/0263363 A1* | 10/2008 | Jueneman et al. | 713/184 |
| 2009/0080664 A1* | 3/2009 | Jung ... G11B 20/00086 | 380/286 |
| 2009/0151006 A1* | 6/2009 | Saeki et al. | 726/28 |
| 2009/0182919 A1* | 7/2009 | Chang ... G06F 13/4291 | 710/106 |
| 2009/0232312 A1* | 9/2009 | Inoue ... G11B 20/00086 | 380/278 |
| 2010/0023783 A1* | 1/2010 | Ambady ... G06F 21/10 | 713/193 |
| 2010/0199103 A1* | 8/2010 | Van Rijnswou | 713/189 |
| 2011/0010470 A1* | 1/2011 | Hulbert et al. | 710/13 |

* cited by examiner

METHOD FOR OFFLINE DRM AUTHENTICATION AND A SYSTEM THEREOF

This application claims priority to Chinese Patent Application No. 200710175552.6, entitled "A method for offline DRM authentication and a system thereof" and filed with the Chinese Patent Office on Jan. 16, 2008, which is hereby incorporated by reference in its entirety.

FIELD OF THE INVENTION

The present invention relates to the field of information security, and more particularly, to a method for offline DRM authentication and a system thereof.

BACKGROUND OF THE INVENTION

With the rapid development of the internet and e-business in recent years, more and more government and regional systems move to electronic processes and transactions, such as e-office by the government, e-bank, e-shopping etc. Thus, more and more information relating to personal privacy and commercial secrets needs to be transferred through the internet. However, some malicious threats such as virus, hacker, or fraud trade on the internet lead to big economic and spiritual loss to the user.

The authentication device is a small hardware device with a processor and a memory and can be connected to a computer through a data communication interface. The device has the functions such as key generation, secure key storage and encryption algorithm presetting. The calculation related to the key is performed completely inside the authentication device with the features of anti-attack and high security. Generally the authentication device is connected to the computer via a USB interface.

The authentication device verifies the legitimacy of the user identity by the PIN (Personal Identification Number) code or biometrics such as fingerprint or iris. In the process of verification, the authentication device is connected to the computer and the user enters the PIN code or the biometrics into the computer. The authentication device verifies the PIN code and the biometrics automatically. Only if the PIN code or biometrics is correct, can the user be allowed to use the authentication device. The authentication device has the features of physical anti-attack and high security.

Many information security operations can be performed by the authentication device. The operations include the data interaction (the written data is encrypted or the read data is de encrypted inside the authentication device), the identity authentication information process, the password storage/verification, the signature storage/verification, the certificate storage/verification, the right management and the data calculation by presetting codes etc. The presetting codes include the presetting user software program segment (the user software program segment cannot be read from the authentication device, the data calculation is performed inside the authentication device) and the presetting application interface function of the software protection (the interface function is an interface level function between the authentication device and software developer application) etc.

DRM (Digital Rights Management) is an approach to the protection of multimedia contents (private videos, music or other data and so on) against unauthorized copy and play for the content provider. With the DRM technology, the digital contents is protected by encryption or adding more usage rules, wherein the usage rules are adapted to determine whether the user has the right to play the digital contents. Generally, the usage rules can prevent the contents from being copied or limit the playing count of the contents. Operation system and multimedia middleware are responsible for carrying out these rules.

DRM as an advanced technology for copyright protection is introduced by Microsoft. For example, most of the high definition films of ChinaVnet are protected by DRM. The encrypted films can not be played through Media Player directly. If a user pays the fee for playing the film, the user can obtain a valid license of the film after every click and play the encrypted film. The effect of playing the film is not affected by the encryption.

The working principle of the DRM is that the developer combines a license key seed with a key ID to generate a key via a content package program and sends the same license key seed to the server as well. Afterwards the developer encrypts the contents with the key, and inserts the key ID and the URL that distributes the copyright license into the header of the contents. And then the content package program packs the header of the contents and the encrypted contents into one media file and distributes the media file to the user. When the user starts to use a player, the player requests the media copyright manager to determine whether the media file is permitted to play. Then the media copyright manager begins to search the license of the media contents in the copyright database. If the search is failed, the media copyright manager will request a new license from a copyright license distribution program of the server. The copyright license distribution program will combine the license key seed with the key ID sent from the developer to generate a same key. Then the copyright license distribution program encrypts the key and generates a copyright license as well. The encrypted key and a certificate obtained from the media copyright license service are added into the copyright license. Then the copyright license distribution program signs a signature on the copyright license by the public key of the certificate. Finally, the copyright license distribution program sends the signed copyright license to the media copyright manager of the user's computer. The media copyright manager verified the signature and places the license in the copyright database. The media copyright manager decrypts the license and sends the requested multimedia contents packet to the player.

As can be seen from the working principle of the DRM, the server is quite important in case that the user wants to request a new copyright license. If the user can not access the internet, the user can not get a new copyright license through the internet to open the protected file. That brings inconvenience to the user.

SUMMARY OF THE INVENTION

To eliminate the limitation that a license must be requested from the server in the process of DRM authentication, the present invention provides a method and a system thereof that the user can get the information protected by the DRM in case no Network connection is available. In addition, with lower cost and limit to times of use of the copyright license, the present invention provides a method for offline DRM authentication and a system thereof which make the contents be more secured.

A method for offline DRM authentication, in which, the method includes:

encrypting a data file with a DRM encryption standard and storing internal information into an authentication device;

verifying the legitimacy of the internal information in the authentication device by a software program on a local computer to which the authentication device is connected; and if legitimate, opening and reading the data file encrypted with the DRM encryption standard.

Opening and reading the data file includes the steps of:

1) determining whether a copyright license for reading the data file is requested by the software program, and if so, sending a license request to the authentication device and go to step 2); otherwise, reading the data file directly and ending;

2) verifying legitimacy of the internal information after the authentication device receiving the license request sent from the software program, and if legitimate, returning the license information to the local computer by the authentication device and go to step 3); otherwise, returning an error message and ending; and 3) analyzing the license information from the authentication device and generating a corresponding copyright license by the local computer, decrypting the data file which is encrypted with the DRM encryption standard by using the key of the copyright license, opening the data file and responding to the operation of the client by the software program.

The Microsoft DRM authentication is supported by the software program; the internal information includes a seed ID, a key, a public key, a key ID, a public key ID, developer information and/or a certificate name.

The license request is generated from the data file, and the license request includes a seed ID, a public key ID, a contents ID, a properties and/or address.

The step 1) includes: searching for the copyright license of the data file by the software program of the local computer, and if the copyright license is found, decrypting the data file which is encrypted with the DRM encryption standard by the software program by using of the key of the copyright license and opening the data file; otherwise, sending a license request to the authentication device via a service program which is preinstalled on the local computer by the software program;

Accordingly, in the step 3) that analyzing the copyright license information returned from the authentication device to generate the corresponding copyright license by the local computer includes: analyzing the license information returned from the authentication device to generate the corresponding copyright license by the service program supporting the HTTP protocol.

Searching for the copyright license of the data file by the software program of the local computer includes: searching for the backup copyright license saved in the process of the former request for the copyright license on the disk of the local computer by the software program.

The method further includes: after the copyright license is found by the software program, connecting the software program to the authentication device to verify the legitimacy of the copyright license via the service program, and if legitimate, decrypting the data file which is encrypted with the DRM encryption standard by the software program by using the key of the copyright license and opening the data file; otherwise, returning an error message.

The service program supports the HTTP protocol.

the step 1) includes: reading the information of the data file by the software program to determine whether the data file is encrypted, and if the data file is not encrypted with the DRM encryption standard, opening the data file normally by the software program, otherwise, sending the license request to the authentication device directly by the software program;

the step 3) that analyzing the license information returned from the authentication device and generating the corresponding copyright license by the local computer includes: analyzing the license information returned from the authentication device directly by the software program on the local computer to generate the corresponding copyright license.

The method of the step 2) includes: receiving the license request by the authentication device and decrypting the license request by using the pre-stored decryption algorithm inside the authentication device, and verifying whether the decrypted license request is legitimate by comparing it with the internal information stored in the authentication device, and if so, returning the license information to the local computer by the authentication device, otherwise, returning an error message.

The license information includes a key, a right, client information, a priority and/or a certificate.

The authentication device is a USB key.

A system for offline DRM authentication includes an authentication device, content provider side and a client PC with a preinstalled software program, the content provider side is adapted to encrypt the data file with a DRM encryption standard and store the internal information into the authentication device, the client PC with the preset software program opens and reads the data file which is encrypted with the DRM encryption standard and provided by the content provider side after the preinstalled software program verifies that the internal information pre-stored in the authentication device by the content provider side is legitimate.

The client PC includes:

a determination module, which is adapted to determine whether the copyright license for the data file is requested; and if so, the software program sends the copyright license request to the authentication device; otherwise, the software program opens the data file directly;

a communication module, which is adapted to receive the encrypted data file sent from the encryption module and the license information sent from the authentication device; and an analysis module, which is adapted to analyze the license information received by the communication module to generate the corresponding copyright license, decrypt the data file encrypted with the DRM encryption standard by using the copyright license and open the data file, and respond to the operation of the user as well;

the authentication device includes:

a DRM service module adapted to verify the legitimacy of the internal information when the license request is received by the authentication communication module, if the internal information is legitimate, the DRM service module returns the license information to the client PC, otherwise, an exceptional processing will be performed; and an authentication communication module adapted to connect the client PC to the authentication device and receive the license information sent from the determination module; and the content provider side includes: an encryption module adapted to encrypt the data file with the DRM encryption standard and send the encrypted data file to the client PC; and a storage module adapted to store the internal information into the authentication device.

The determination module is the copyright license determination module, which is adapted to determine whether the data file has the copyright license by the software program, and if so, the software program decrypts the data file which is encrypted with the DRM encryption standard by using a key of the copyright license and opens the data file; otherwise, the software program sends the license request to the service program preinstalled on the client PC and requests for the copyright license again;

accordingly, the analysis module is the service program analysis module, which is adapted to send the license request to the authentication device when the preset service program preinstalled on the client PC receives the license request sent from the copyright license determination module, and analyze the license information returned from the authentication device to generate the corresponding copyright license, the software program decrypts the data file encrypted with the DRM encryption standard by using the key of the copyright license, opens the data file and responds to the operation of the user as well.

The determination module is the encryption determination module, which is adapted to determine whether the data file is encrypted with the DRM encryption standard, and if so, the software program sends the license request to the analysis module; otherwise, the software program opens the data file which is not encrypted with the DRM encryption standard;

accordingly, the analysis module is the software sending and analysis module, which is adapted to send the license request to the authentication device directly when it receives the license request sent from the encryption determination module, and analyze the license information returned from the authentication device to generate the corresponding copyright license, the software program decrypts the data file encrypted with the DRM encryption standard by using the key of the copyright license and opens it and responds to the operation of the user as well.

The DRM service module is adapted to store the key data including the digital certificate, the key and/or the private data of user.

The DRM service module is adapted to store a user program which writes and calls an algorithm customized by the user.

The service program preinstalled on the client PC in the service program analysis module is capable of receiving a request of HTTP protocol, accessing the authentication device and generating license information.

The license request is generated from the data file and includes the seed ID, the public key ID, the contents ID, the contents identifier, the properties and/or the address; the license information includes a key, a right, client information, a priority and/or a certificate.

The authentication device is a USB key.

As described above, the present invention provides an authentication device as a substitute for the server to provide a new copyright license, allowing the user to use the DRM protected contents without a network connection. Therefore, the use of the contents is more convenient, and the cost is reduced. Furthermore, with limit to times of use of the copyright license, the contents are secured reliably. Meanwhile, the developer can use the DRM solution via the authentication device in case of no DRM server.

DETAILED DESCRIPTION OF THE PREFERRED EMBODIMENTS

In order to solve the problem caused by the limitation that a copyright license must be requested from the server in the process of the DRM authentication, the present invention provides an authentication device as substitute for the server in the process of the offline DRM authentication to send a new copyright license. The user can use the contents protected by DRM even without the network, which brings more convenience. Furthermore, with limit to times of using the copyright license, the contents are secured reliably and the cost is lower. Meanwhile, the developer can use the DRM protection solution via the authentication device in case of no DRM server.

The server/client mode is applied in the digital copyright management at present. The server/client mode includes two processes: (1) the process of packing and encrypting the digital media that need to be protected; (2) the process of the copyright license distribution. Specifically speaking, the content provider (developer) encrypts and packs the data file that need to be protected, and writes the copyright license and other corresponding information into the header of the data file, and puts the data file to the place such as internet and CD where the user can access. When Windows Media Player plays the data file obtained by the user, the copyright license manager in the Player will ask the user to request for the copyright license for the data file and the user can play the data file when he get the copyright license. The copyright license contains the decryption key, user rights to access the data file and copyright license such as times of playing and copying the data file and the expiration date, and so on. The content provider will charge the user with different payment levels according to the content of the copyright license.

Embodiment 1

Figure 1:
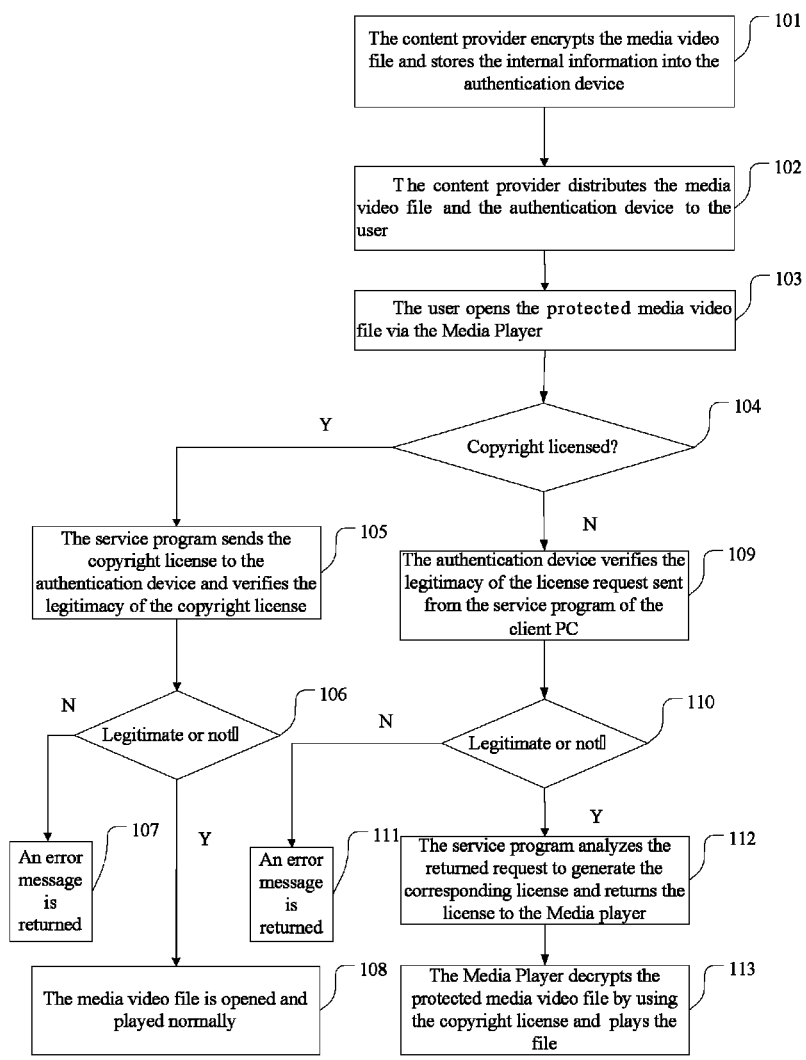
FIG. 1 shows a flow chart of a method for offline DRM authentication according to the embodiment 1 of the present invention.

A control method for offline DRM authentication is presented in the Embodiment 1. The data file protected by DRM is media video file, and the software program is Media Player. Referring to FIG. 1, the method includes the steps of:

Step 101: content provider encrypts the media video file with the DRM standard and stores the internal information into the authentication device to complete the manufacture of the authentication device.

A special URL is specified in the media video file.

The URL must be a local address with specified port such as http://127.0.0.1:8080/licence.asp. Any port numbers that have not been occupied by other programs can be specified.

Specifically, the step 101 includes: the content provider encrypts the media video file that need to be protected, packs the header of the media video file and signs the header. The signed header and the encrypted media video file are packed together and the internal information is stored into the authentication device to complete the manufacture of the authentication device.

The internal information includes the seed ID, the key, the public key, the key ID and the public key ID, the developer information and certificate name.

Step 102: the content provider distributes the media video file, the service software program and the authentication device to the user.

Step 103: when the user receives the products distributed by the content provider, the user installs the service software program and connects the authentication device to the local computer and opens the media video file protected by DRM via the Media Player.

Media Player is a software program that supports the DRM and requests and obtains the DRM copyright license by the HTTP.

If the player does not support DRM, the player will be failed to open a protected file by calling the function of IWMReader: Open and return the information as NS_E_PROTECTED_CONTENT or other error message.

Step 104: the Media Player searches for the copyright license after the media video file protected by DRM is opened, if it finds the copyright license, go to step 105; otherwise, go to step 109, the Media Player requests the copyright license again.

When the Media Player supporting DRM opens the media video file protected by DRM, the DRM components searches the local system automatically to obtain a valid copyright license. If the Media Player finds the copyright license, the DRM components will decrypt the media video file automatically, and the right of decrypting the media video file is specified in the copyright license. If the Media Player does not find a valid copyright license, it will get a state notification from the DRM components and initiate the copyright license application automatically; if the Media Player obtains a valid copyright license, the media video file will be decrypted. In addition, with the copyright license permission, a backup copyright license can be saved on the local computer.

The Media Player searches the copyright license on the disk of the local computer. If the copyright license has been obtained before, a backup copyright license has been saved on the disk of the local computer.

Step 105: if the Media Player finds the copyright license, it sends the copyright license information to the service program and the service program sends the copyright license information to the authentication device. The authentication device verifies the legitimacy of the received copyright license information and go to step 106.

Step 106: the legitimacy of the copyright license will be verified in the authentication device. If the copyright license is not legitimate, go to step 107; otherwise, the information will be returned to the service program and the service program will generate a new copyright license and return the copyright license to the Media Player and go to step 108.

Step 107: an error message is returned.

Step 108: the Media Player opens and plays the media video file as normal.

The new copyright license returned back to the Media Player may contain only the right to play (times or duration). If the count for playing the media file is 10, an identifier will be sent from the service program to the Media Player, so that the Media Player can open the file normally. If the play count of the right is 0, the identifier can not be returned to the Media Player. Therefore, even if the backup copyright license is legitimate, the media video file can not be played and the user must decide whether to request a new copyright license.

Step 109: if the Media Player does not find the copyright license, the Media Player will send the copyright license request again to the service program to obtain the copyright license. The service program analyzes the copyright license request from the Media Player and sends the request to the authentication device. The authentication device determines the legitimacy of the request according to the stored internal information.

The process of listening the port by the service program includes: the program initiates a new process to listen the specified port after the service program is started. In order to prevent the port from being used by other computers or external network, the service program only accepts the request from the IP of the local computer. When a copyright license request is received from the local computer, the listened port reads the license request information firstly and initiates the analytic function of the request. All of the elements of the license request information are kept for the later verification and license generation.

The process of determining the legitimacy of the request in the step 109 includes: after the authentication device receives the encrypted copyright license request sent from the service program, the information decrypted by the decryption algorithm in the authentication device is compared with the internal information stored in the authentication device to verify the legitimacy and right management.

The license request is the content header which includes the seed ID, the contents ID, the contents identifier, the properties and the address.

The copyright license request is generated when the data file is encrypted and packed with the DRM encryption standard. The process includes: if the copyright license has not been found, the Media Player reads the header of the media video file to generate license request information package which will be sent to the specified address in the header.

The algorithms include RSA, DES, 3DES, HMAC-MD5, TEA, NOT, reverse and XOR etc.

The legitimacy verification for the copyright license verifies whether the copyright license is the one for the media video file and valid, which needs to be linked to the service program.

The right management includes backup, restore, playing on the PC, copying to the CD, start date, expiration date, security level and management of the playing count, which needs to be linked to the service program.

The service program supports the HTTP and can accept the request of the HTTP and access the authentication device and generate the license information.

HTTP (Hypertext Transfer Protocol) is a protocol for transferring the hypertext from the WWW server to local browsers.

Properties are an optional set of specified values for identifying the owner of the content, the name of the author, the type of the content etc.

Step 110: the legitimacy of the license request is determined, if the license request is not legitimate, go to step 111; otherwise, go to step 112, the authentication device returns the license information to the service program.

The license information includes the seed ID, the right, the priority and the client information.

Step 111: an error message is returned.

Step 112: the authentication device sends the license information to the service program, and the service program generates the copyright license according to the DRM after it receives the license information returned from the authentication device and distributes the license to the Media Player.

The license request information contains the user information and media video file information. When the user submits the license request and sends the request to the service program, the service program analyzes the request to get the seed ID, the public key ID, the contents ID and the right. The analyzed request is sent to the authentication device. The analyzed request is decrypted by using the algorithm and compared with the internal information in the authentication device, thereby, the legitimacy of the license request is determined. The seed, the private key, the contents ID and the right is generated. The seed ID, the seed and the right are put into the WMRMLicgen object and the license is generated. The license is fed back to the user via the WMRMResponse and the Media Player decrypts the license.

The seed ID is the only number for the seed, and the key ID is the only number for the key, and the public key ID is the only number for the public key. In the service program, the key ID and the seed is put into the WMRMKeys object to generate the decryption key. And the license is generated by putting the key, the public key, the seed and other right information into the WMRMLicGen.

The mechanism of the DRM means that the interface function for creating the license certificate is provided in the DRM SDK of the Microsoft.

Step 113: the Media Player decrypts the protected media video file and opens it to play after the Media Player obtains the copyright license.

The media video file is decrypted via the key in the copyright license.

Embodiment 2

The method in the embodiment adopts the encryption of DRM of Microsoft and combines the software program with the hardware without the WEB server. Since the format of the file type is well-known, the file defined with the new format can not be opened by itself and needs a software program which can open many types of files and support DRM.

The method in the present embodiment protects the .txt files and the data files only.

Figure 2:
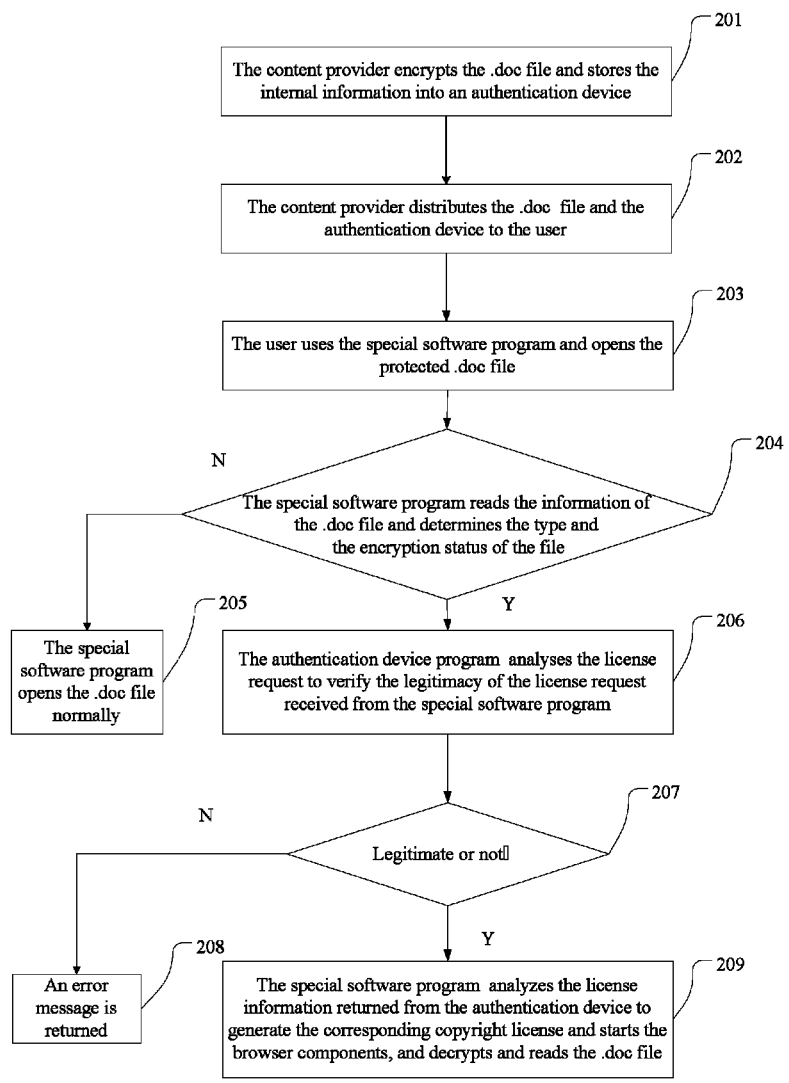
FIG. 2 shows a flow chart of a method for offline DRM authentication according to the embodiment 2 of the present invention.
Figure 3:
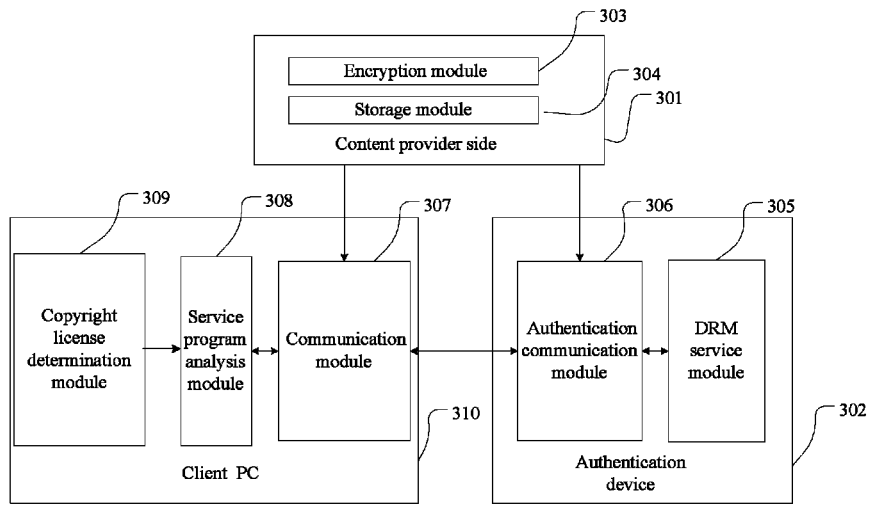
FIG. 3 shows a diagram of a system for offline DRM authentication according to the embodiment 3 of the present invention.
Figure 4:
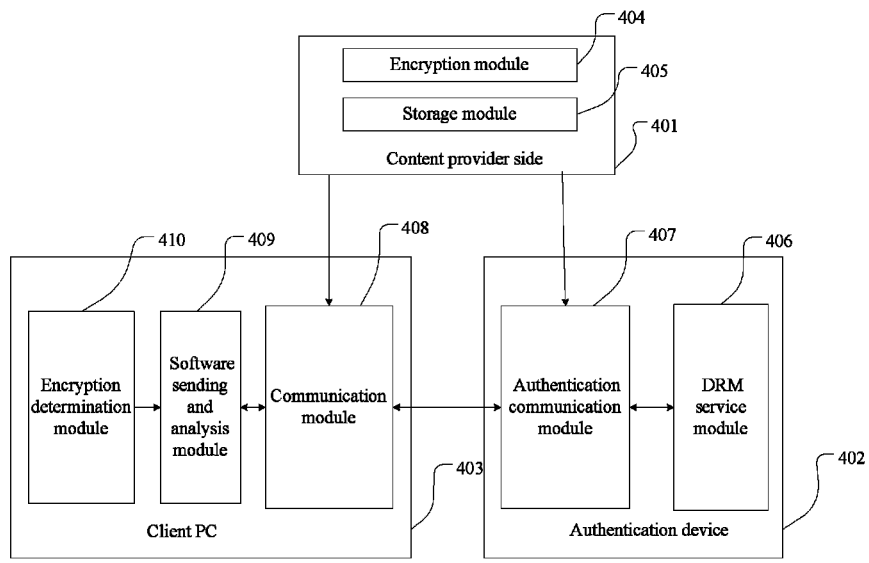
FIG. 4 shows a diagram of a system for offline DRM authentication according to the embodiment 4 of the present invention.

Referring to FIG. 2, a method for the offline DRM authentication method in the embodiment includes the steps of:

Step 201: the content provider encrypts the .doc file and stores the internal information into the authentication device and completes the manufacture of the corresponding authentication device.

A special URL is specified in the .doc file.

The URL must be a local address with specified port such as http://127.0.0.1:8080/licence.asp. Any port numbers that have not been occupied by other programs can be specified.

The step 201 includes: the content provider encrypts the .doc file to be protected (the encryption methods are different for the different digital information. For example, the encryption of the software program can be realized by encrypting one or more critical files), packs the header of the .doc file, signs the packed header, and packs the signed header and the encrypted .doc file together, then stores the internal information into the authentication device to complete the manufacture of the authentication device.

The content provider can encrypts many types of files such as .doc file, .pdf file and .txt file etc.

The internal information includes the seed ID, the key, the public key, the key ID, the public key ID, the developer information and the certificate name.

Step 202: the content provider distributes the .doc file and the authentication device to the user.

Step 203: the user receives the products distributed by the content provider and connects the authentication device to the local computer. The user opens the special software program, starts the anti-copy program and opens the protected .doc file.

The special software program supports the DRM authentication of Microsoft.

The special software program is a browser for opening the .doc file and can open the file in other format such as .doc, .pdf, .ppt, .txt and .xls and so on.

The user can open the protected .doc file via the special software program, which improves the security of the .doc file.

The user verifies whether the obtained .doc file is the legitimate software program distributed from the legal manufacturer by verifying the signature on the .doc file.

Step 204: the special software program reads the information about the .doc file and determines whether the file is encrypted, if so, go to step 206; otherwise, go to step 205.

The file can be opened by the special software program no matter it is encrypted or not. For example, if the file is .doc type before the encryption, the file can be opened in the format of .doc after the decryption.

Step 205: the special software program opens the .doc file as normal.

Step 206: the special software program sends a license request to the authentication device, and the authentication device verifies the legitimacy and the right management of the license request within the authentication device when the authentication device receives the license request from the special software program.

The license request is the content header comprising the seed ID, the public key, the public key ID, the contents ID, the contents identifier, the key ID, the properties and the address.

The license request is generated from the information written into the .doc file when the data file is encrypted with the DRM encryption standard. Specifically, the special software program reads the header of the .doc file in case that it does not find the copyright license and generates the license request which is sent to the specified address in the header.

The contents identifier is the optional character string adapted to identify the contents uniquely.

The key ID is the character string for generating the key.

Properties are an optional set of specified values for identifying the owner of the content, the name of the author, the type of the content etc.

Step 206 includes: when the authentication device receives the encrypted license request sent from the special software program, the license request decrypted by using the algorithm is compared with internal information stored in the authentication device within the authentication device to verify the legitimacy of the license request.

The algorithm includes RSA, DES, 3DES, HMAC-MD5, TEA, NOT, reverse and XOR etc.

Legitimacy verification is used for verifying whether the license of the data file is the valid one for the data file. The operation of the verification needs to be linked to the special software program.

The right management includes backup, restore, playing on the PC, copying to the CD, start date, expiration date, security level and management of the playing count, which needs to be linked to the service program.

Step 207: determine whether the license request is legitimate, and if so, return the license back to the special software program and go to step 209; otherwise, go to step 208.

The license includes the key, the right, the priority, the client information, the priority and the certificate.

Step 208: an error message is returned.

Step 209: the special software program obtains the license information returned from the authentication device to generate the corresponding copyright license and starts the browser components for .doc format, decrypts and reads the .doc file.

The decryption is realized by decrypting the .doc file with the key in the copyright license.

The present embodiment introduces that the special software program supporting the DRM authentication can open the corresponding file types, which can protect many types of files such as .doc, .txt, .ppt in the mode of DRM.

Embodiment 3

A system for offline DRM authentication includes an authentication device, a client PC and content provider side.

The content provider side 301 is adapted to encrypt the media video file with the DRM encryption standard and store the internal information into the authentication device.

The client PC 310 is adapted for the user to open and read the media video file via the Media Player on the local computer.

The client PC 310 includes:

a communication module adapted to receive the encrypted media video file sent from the encryption module and the license information sent from the authentication device; and a copyright license determination module 309 adapted to determine whether the data file has the copyright license for opening the data file, and if so, the software program sends the copyright license request to the preinstalled service program on the client PC to request a copyright license; otherwise, the software program decrypts the data file which is encrypted with the DRM encryption standard and opens the data file; and a service program analysis module 308 adapted for the preinstalled service program on the client PC to send the license request received from the copyright license determination module to the authentication device, and generate the corresponding copyright license by analyzing the license information returned from the authentication device. The software program makes use of the copyright license to decrypt the data file which is encrypted with the DRM encryption standard and opens the data file to respond to the operation of the user.

The authentication device includes:

a DRM service module 305 adapted to verify the internal information when the authentication communication module receives the license request. If the license request is legitimate, the license information will be returned to the client PC; otherwise, the operation is regarded as exceptional processing; and an authentication communication module 306 adapted to connect the authentication device to the client PC and receive the license request sent from the copyright license determination module.

The content provider side 301 includes:

an encryption module 303 adapted to encrypt the media video file with the DRM encryption standard and send the encrypted media video file to the client PC; and a storage module 304 adapted to store the internal information into the authentication device.

The Media Player on the client PC includes a determination module.

The internal information includes the seed ID, the key, the public key, the key ID, the public key ID, the developer information and the certificate name.

The DRM service module is adapted to store the key data comprising the digital certificate, key and private data of the user.

The DRM service module is adapted to store the user program for user to write into and call the algorithm customized by the user.

The Media Player requests and obtains the DRM copyright license by using HTTP to support the DRM authentication.

The service program can receive the request of the HTTP protocol and access the authentication device and generate the license.

Hypertext Transfer Protocol is a protocol that adapted to transfer the hypertext from the WWW server to the local browser.

The license request includes the seed ID, the public key ID, the contents ID, the contents identifier, properties and the address is generated from the media video file.

The license information includes the key, the right, the priority, the client information, and the certificate.

The contents identifier can be the optional character string adapted to identify the contents.

The key ID is the character string for generating the key.

The authentication device is a USB key.

Embodiment 4

A system for the offline DRM authentication includes an authentication device, a client PC and content provider side.

The content provider side 401 is adapted to encrypt the .doc file with the DRM encryption standard and store the internal information into the authentication device.

The client PC 403 is adapted for the user to open and read the data file by the special software program on the local computer.

The client PC 403 includes:

a communication module 408 adapted to receive the encrypted .doc file from the encryption module and the license from the authentication device;

an encryption determination module 410 adapted to determine whether the .doc file is encrypted with the DRM encryption standard, and if so, the special software program sends the license request to the analysis module; otherwise, the special software program opens the .doc file which is not encrypted with the DRM encryption standard as normal;

the analysis module is a software sending analysis module 409 adapted for the special software program to send the license request to the authentication device upon receipt of the license request sent from the encryption determination module, and analyze the returned license information from the authentication device to generate the corresponding copyright license, and the special software program makes use of the copyright license to decrypt the .doc file which is encrypted with the DRM encryption standard and opens the .doc file to respond the operation of the user.

The authentication device 402 includes:

a DRM service module 406 adapted to verify the internal information of the data file and store the internal information when the authentication communication module receives the license request, if the license request is legitimate, the license information will be returned to the client PC, otherwise, the operation is regarded as exceptional processing; and an authentication communication module 407 adapted to connect the authentication device to the client PC and receive the license request sent from the determination module.

The content provider side 401 includes:

an encryption module 404 adapted to encrypt the data file with the DRM encryption standard and send the encrypted data file to the client PC; and a storage module 405 adapted to store the internal information into the authentication device.

The special software program of the client PC includes a determination module and a special software program sending and analysis module.

The internal information includes the seed ID, the key, the public key, the key ID, the public key ID, the developer information and the certificate name.

The DRM service module 406 is adapted to store the key data which includes the digital certificate, the key and the private data of the user.

The DRM service module 406 is also adapted to store the user program for user to write into and call the algorithm customized by the user.

The special software program supports the DRM authentication, which requests and obtains the DRM copyright license on the basis of the HTTP protocol.

The service program can receive the request of the HTTP and access the authentication device and generate the license.

The license request is generated from the data file and includes the seed ID, the public key ID, the contents ID, the contents identifier, the properties and the address.

The license includes the key, the right, the priority, the client information, the priority and the certificate.

The authentication device is a USB key.

The special software program supports the DRM authentication.

The special software program is adapted to provide the .doc file and can open files of other types such as .pdf, .txt, .ppt or .xls.

The contents identifier can be optional character string adapted to identify the contents.

The identifier of the key is the character string for generating the key.

The presently disclosed embodiments should be considered in all respects to be illustrative and not restrictive. The scope of the invention is indicated by the appended claims rather than the foregoing description, and all variations which come within the meaning and range of equivalents thereof are intended to be embraced therein.

What is claimed is:

1. A method for offline DRM authentication, wherein the method comprises:

encrypting, by a content provider, a data file with a DRM encryption standard, wherein the data file is delivered to a local computer;

storing, by the content provider, internal information into a third party authentication device in the form of hardware before distributing the third party authentication device to a user, wherein the internal information includes a seed ID, a key, a public key, a key ID, a public key ID, developer information and/or a certificate name;

distributing the third party authentication device to the user;

connecting the third party authentication device to the local computer;

performing offline DRM authentication between the local computer and the third party authentication device after the third party authentication device is delivered to the user, wherein the third party authentication device enables the user to use the data file encrypted with the DRM encryption standard and stored on the local computer without a network connection, wherein performing offline DRM authentication includes:

1) determining, by the local computer connected with the third party authentication device, whether a copyright license for reading the data file is requested by a software program operating on the local computer and includes a seed ID, a public key ID, a contents ID, a properties and/or address, and if so, sending a license request to the third party authentication device, wherein the license request is generated from the data file, and the license request comprises the seed ID, the public key ID, the contents ID, the properties and/or the address;

2) offline verifying, by the third party authentication device, a legitimacy of the license request by decrypting the license request using a pre-stored decryption algorithm inside the third party authentication device, and by comparing information from the decrypted license request with the internal information stored in the third party authentication device after the third party authentication device receives the license request sent from the software program; and returning a license information to the local computer by the third party authentication device; and 3) analyzing the license information received from the third party authentication device by the local computer and generating a corresponding copyright license based on the license information by the local computer, decrypting the data file which is encrypted with the DRM encryption standard by using a key of the copyright license, opening the data file and responding to an operation of a user by the software program;

wherein the third party authentication device is external to the local computer and the content provider.

2. The method of claim 1, wherein a Microsoft DRM authentication is supported by the software program.

3. The method of claim 1, wherein the step 1) comprises: searching for the copyright license of the data file by the software program of the local computer, and if the copyright license is found, decrypting the data file which is encrypted with the DRM encryption standard by the software program by using of the key of the copyright license and opening the data file; otherwise, sending a license request to the third party authentication device via a service program which is preinstalled on the local computer by the software program; the step 3) of analyzing the license information returned from the third party authentication device and generating the corresponding copyright license by the local computer comprises: analyzing the license information returned from the third party authentication device to generate the corresponding copyright license by the service program supporting the HTTP protocol.

4. The method of claim 3, wherein searching for the copyright license of the data file by the software program of the local computer comprises: searching for a backup copyright license saved in the process of the former request for the copyright license on the disk of the local computer by the software program.

5. The method of claim 3, wherein the method further comprises: after the copyright license is found by the software program, connecting the software program to the third party authentication device to verify the legitimacy of the copyright license via the service program, and if legitimate, decrypting the data file which is encrypted with the DRM encryption standard by the software program by using the key of the copyright license and opening the data file; otherwise, returning an error message.

6. The method of claim 1, wherein the step 1) comprises: reading information of the data file by the software program to determine whether the data file is encrypted, and if the data file is not encrypted with the DRM encryption standard, opening the data file normally by the software program, otherwise, sending the license request to the third party authentication device directly by the software program;

the step 3) of analyzing the license information returned from the third party authentication device and generating the corresponding copyright license by the local computer comprises: analyzing the license information returned from the third party authentication device directly by the software program on the local computer to generate the corresponding copyright license.

7. The method of claim 1, wherein the license information includes a key, a right, client information, a priority and/or a certificate.

8. The method of claim 1, wherein the third party authentication device is a USB key.

9. A system for offline DRM authentication, wherein the system comprises:

a third party authentication device in the form of hardware that is distributed to a user, a content provider computing device and a client PC with a preinstalled software program, wherein the third party authentication device is connectable to the client PC and enables a user to use DRM protected content without a network connection, the third party authentication device is external to the local computer and the content provider;

the content provider computing device is adapted to encrypt a data file with a DRM encryption standard and store internal information into the third party authentication device before distributing the third party authentication device to the user, wherein the data file is delivered to the client PC, the client PC with the preinstalled software program opens and reads the data file which is encrypted with the DRM encryption standard and provided by the content provider computing device after the third party authentication device is connected to the client PC and verifies that an offline license request from a software program on the client PC is legitimate according to the internal information pre-stored in the third party authentication device, wherein the internal information includes a seed ID, a key, a public key, a key ID, a public key ID, developer information and/or a certificate name wherein, the client PC comprises:

a determination module adapted to determine whether a copyright license for the data file is requested, the copyright license including a seed ID, a public key ID, a contents ID, a properties and/or address, wherein the software program sends the license request to the third party authentication device, wherein the license request is generated from the data file, and the license request comprises the seed ID, the public key ID, the contents ID, the properties and/or the address;

a communication module, which is adapted to receive an encrypted data file sent from an encryption module and license information sent from the third party authentication device; and an analysis module adapted to analyze the license information received by the communication module and generate the corresponding copyright license based on the license information, decrypt the data file encrypted with the DRM encryption standard by using the copyright license and open the data file, and respond to an operation of a user as well;

the third party authentication device comprises:

a DRM service module adapted to offline verify legitimacy of the license request, after the license request is received by the third party authentication device, by decrypting the license request using a pre-stored decryption algorithm inside the third party authentication device, and by comparing information from the decrypted license request with the internal information pre-stored in the third party authentication device, wherein the DRM service module returns the license information to the client PC for a legitimate license request; and an authentication communication module adapted to connect the client PC to the third party authentication device and receive the license request sent from the determination module; and the content provider computing device comprises:

an encryption module adapted to encrypt the data file with the DRM encryption standard and send the encrypted data file to the client PC; and a storage module adapted to store the internal information into the third party authentication device.

10. The system of claim 9, wherein the determination module is a copyright license determination module, which is adapted to determine whether the data file has the copyright license by the software program, and if so, the software program decrypts the data file which is encrypted with the DRM encryption standard by using a key of the copyright license and opens the data file; otherwise, the software program sends the license request to a service program preinstalled on the client PC and requests for the copyright license again;

the analysis module is a service program analysis module, which is adapted to send the license request to the third party authentication device when the service program preinstalled on the client PC receives the license request sent from the copyright license determination module, and analyze the license information returned from the third party authentication device to generate the corresponding copyright license, the software program decrypts the data file encrypted with the DRM encryption standard by using the key of the copyright license, opens the data file and responds to the operation of the user as well.

11. The system of claim 10, wherein the DRM service module is adapted to store key data comprising a digital certificate, a key and/or private data of a user.

12. The system of claim 10, wherein the DRM service module is also adapted to store a user program which writes and calls an algorithm customized by the user.

13. The system of claim 10, wherein the service program preinstalled on the client PC in the program service analysis module is capable of receiving a request of HTTP protocol, accessing the third party authentication device and generating license information.

14. The system of claim 9, wherein the determination module is an encryption determination module, which is adapted to determine whether the data file is encrypted with the DRM encryption standard, and if so, the software program sends the license request to the analysis module; otherwise, the software program opens the data file which is not encrypted with the DRM encryption standard;

the analysis module is a software sending and analysis module, which is adapted to send the license request to the third party authentication device directly when it receives the license request sent from the encryption determination module, and analyze the license information returned from the third party authentication device to generate the corresponding copyright license, the software program decrypts the data file encrypted with the DRM encryption standard by using the key of the copyright license and opens it and responds to the operation of the user as well.

15. The system of claim 9, wherein the third party authentication device is a USB key.

* * * * *